United States Patent [19]
Riggio, Jr.

[11] Patent Number: 5,646,513
[45] Date of Patent: Jul. 8, 1997

[54] DYNAMIC LOOP COMPENSATOR FOR CONTINUOUS MODE POWER CONVERTERS

[75] Inventor: Salvatore R. Riggio, Jr., Boca Raton, Fla.

[73] Assignee: International Business Machines Corporation, Armonk, N.Y.

[21] Appl. No.: 401,943

[22] Filed: Mar. 10, 1995

[51] Int. Cl.[6] .................................................. H02M 3/335
[52] U.S. Cl. ........................................ 323/285; 323/282
[58] Field of Search .................................. 323/222, 282, 323/284, 285, 266; 363/89, 81, 124

[56] References Cited

U.S. PATENT DOCUMENTS

| | | | |
|---|---|---|---|
| Re. 31,325 | 7/1983 | Crapo | 323/263 |
| 4,161,771 | 7/1979 | Bates | 363/43 |
| 4,274,132 | 6/1981 | Molyneux-Berry | 363/21 |
| 4,352,055 | 9/1982 | McCartney | 323/263 |
| 4,472,672 | 9/1984 | Pacholok | 320/21 |
| 4,521,671 | 6/1985 | Fronius | 219/130.31 |
| 4,521,672 | 6/1985 | Fronius | 219/130.33 |
| 4,538,231 | 8/1985 | Abe et al. | 364/483 |
| 4,672,303 | 6/1987 | Newton | 323/285 |
| 4,761,725 | 8/1988 | Henze | 363/46 |
| 4,791,348 | 12/1988 | McGuire et al. | 323/263 |
| 4,862,514 | 8/1989 | Kedjierski | 455/161 |
| 4,952,889 | 8/1990 | Irwin et al. | 332/128 |
| 4,964,029 | 10/1990 | Severinsky et al. | 363/80 |
| 4,974,141 | 11/1990 | Severinsky et al. | 363/81 |
| 4,975,820 | 12/1990 | Szepesi | 362/21 |
| 4,990,796 | 2/1991 | Olson | 307/279 |
| 5,132,889 | 7/1992 | Hitchcock et al. | 363/17 |
| 5,235,504 | 8/1993 | Sood | 363/53 |

Primary Examiner—Peter S. Wong
Assistant Examiner—Rajnikant B. Patel
Attorney, Agent, or Firm—Richard A. Tomlin; John C. Black

[57] ABSTRACT

This invention is directed toward a loop compensator which dynamically changes the compensation break points as a function of duty cycle, input voltage and output load current to insure system loop stability. The system identifier of the dynamic loop compensator identifies the converter circuit topology to which it is connected and relays corresponding circuit identification signals to a digital controller. Based on the identification signals, the digital controller implements one of three compensation algorithms that dynamically changes the compensation break points and consequently insures closed loop stability. Based upon system condition signals and one of the three compensation algorithms, the digital controller changes the compensation break points by producing variable frequency clock signals which are input into a bank of capacitors in a switching capcitor error amplifier network. In turn, the clock signals determine the effective resistance of the capacitors in the capacitor bank and accordingly change the location of the poles and zeros of the compensator thereby allowing the compensator to counteract the dynamically changing system.

11 Claims, 11 Drawing Sheets

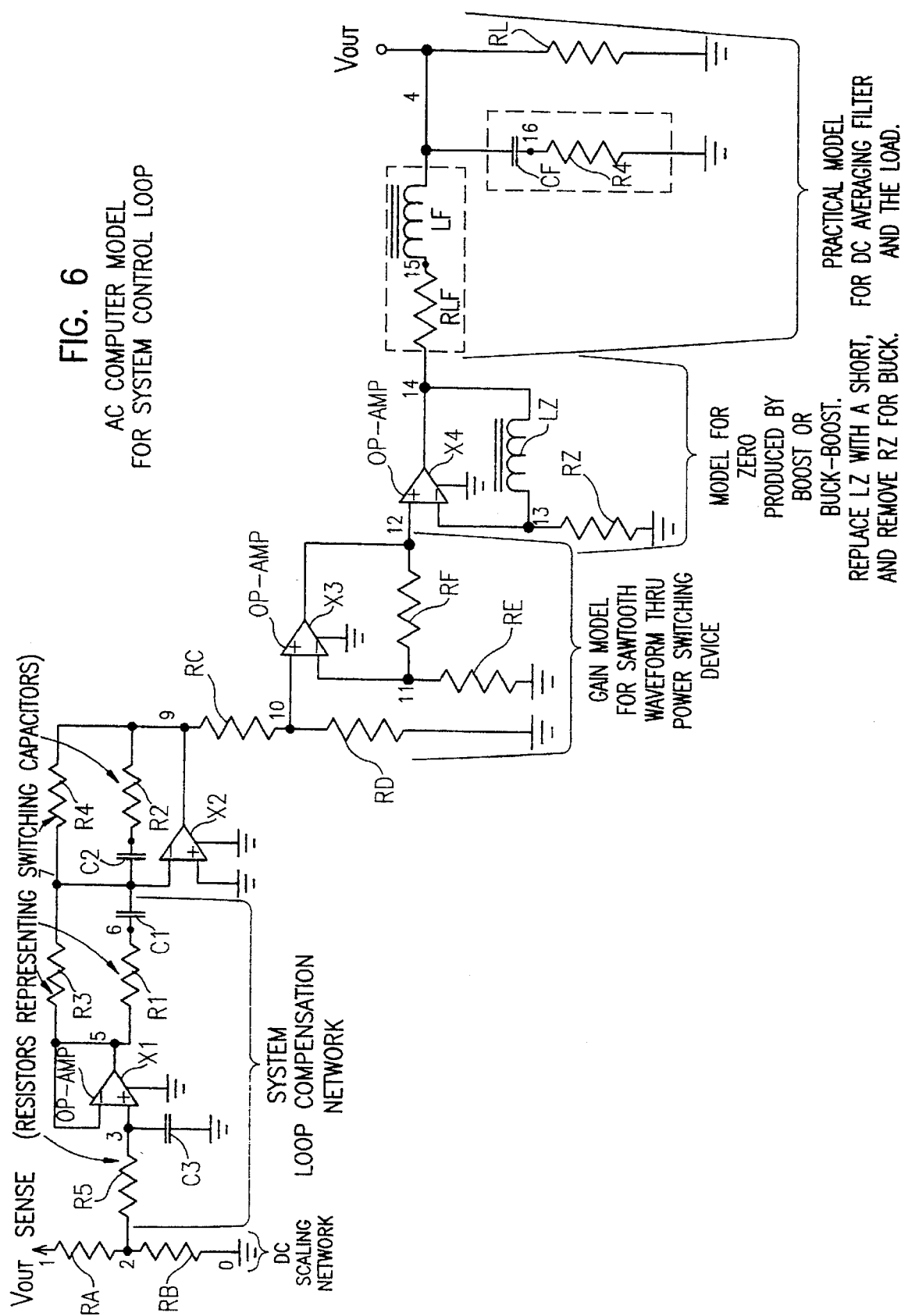

WAVEFORMS FOR SWITCHED CAPACITOR COMPENSATION NETWORK

NON-OVERLAPPING OUT-OF-PHASE CLOCK SIGNALS MUST BE USED

CLK-A ⎍T1⎹T2⎍

CLK-B ⎎T1⎸T2⎎

$$f_{CLK-A} = f_{CLK-B} = \frac{1}{T1+T2} \qquad R3 = \frac{1}{f_{CLK-A} * CR3}$$

CLK-C

CLK-D $$f_{CLK-C} = f_{CLK-D} = \frac{1}{T1+T2} \qquad R1 = \frac{1}{f_{CLK-C} * CR1}$$

CLK-E

CLK-F $$f_{CLK-E} = f_{CLK-F} = \frac{1}{T1+T2} \qquad R4 = \frac{1}{f_{CLK-E} * CR4}$$

CLK-G

CLK-H $$f_{CLK-G} = f_{CLK-H} = \frac{1}{T1+T2} \qquad R2 = \frac{1}{f_{CLK-G} * CR2}$$

CLK-I

CLK-J $$f_{CLK-I} = f_{CLK-J} = \frac{1}{T1+T2} \qquad R5 = \frac{1}{f_{CLK-I} * CR5}$$

---

IN GENERAL:

$$f_{CLK} = \frac{1}{T1+T2} \qquad I = \frac{Q}{T} = \frac{C(V2-V1)}{T1+T2} = \frac{\Delta V}{R}$$

$$\therefore R = \frac{1}{f_{CLK} * C}$$

FIG. 7

$$\frac{V_{14}(s)}{V_{12}(s)} = \frac{sL_z}{R_z} + 1 = \frac{R_z + sL_z}{R_z} \qquad \begin{array}{l} D \text{ - duty cycle} \\ (\text{varies from } 0.1 \text{ to } 0.9) \end{array} \qquad (1)$$

$$Z_{BB} = \frac{R_z}{L_z} = \frac{(1-D)^2 R_L}{L_F} \qquad \text{For Boost} \qquad (2)$$

$$Z_{BB} = \frac{R_z}{L_z} = \frac{(1-D)^2 R_L}{DL_F} \qquad \text{For Buck-Boost} \qquad (3)$$

$$\frac{V_{14}}{V_{12}} = 1 \qquad \text{Therefore, } L_z \text{ and } Z_{BB} \text{ do not exist for buck} \qquad (4)$$

"Practical Model For DC Averaging Filter And The Load"

$$\frac{V_4(s)}{V_{14}(s)} = \frac{\dfrac{R_L}{L_{EF} C_F (R_L+R_{CF})} + \dfrac{s R_L R_{CF}}{L_{EF} (R_L+R_{CF})}}{s^2 + s\left[\dfrac{R_{LF}}{L_{EF}} + \dfrac{1}{C_F (R_L+R_{CF})} + \dfrac{R_{CF} R_L}{L_{EF} (R_L+R_{CF})}\right] + \dfrac{R_L + R_{LF}}{L_{EF} C_F (R_L+R_{CF})}} \qquad (5)$$

$$Z_{F1} = \frac{1}{C_F R_{CF}} \qquad (6)$$

$$P_{P1} = \frac{-B + \sqrt{B^2 - \dfrac{4(R_L+R_{LF})}{L_{EF} C_F (R_L+R_{CF})}}}{2} \qquad (7)$$

FIG. 9(A)

$$P_{F2} = \frac{-B - \sqrt{B^2 - \dfrac{4(R_L+R_{LF})}{L_{EF} C_F (R_L+R_{CF})}}}{2} \tag{8}$$

$$L_{EF} = \frac{L_F}{(1-D)^2} \quad \text{For Boost or Buck-Boost} \tag{9}$$

$$L_{EF} = L_F \quad \text{For Buck} \tag{10}$$

---

"DC Scaling Network"

$$\frac{V_2}{V_1} = \frac{R_B}{R_A+R_B} = \frac{\text{Voltage Reference}}{\text{Output Voltage}} \tag{11}$$

---

"System Loop Compensation Network"

$$\frac{V_9(s)}{V_2(s)} = \frac{-R_4 (1+sC_2R_2)(1+sC_1(R_3+R_1))}{R_3 (1+sC_1R_1)(1+sC_2(R_4+R_2))} * \frac{1}{1+sC_3R_5} \tag{12}$$

SET:

$$Z_1 = \frac{1}{C_1(R_3+R_1)} = P_{F1} = \frac{(f_{CLK-A}*C_{R3}+f_{CLK-C}*C_{R1})}{C_1} \tag{13}$$

SET:

$$Z_2 = \frac{1}{C_2R_2} = P_{F2} = \frac{(f_{CLK-G}*C_{R2})}{C_2} \tag{14}$$

SET:

$$P_1 = \frac{1}{C_1R_1} = Z_{F1} = \frac{(f_{CLK-C}*C_{R1})}{C_1} \tag{15}$$

FIG. 9(B)

SET:

$$P_2 = \frac{1}{C_2 (R_4+R_2)} = \frac{1}{100\sqrt{L_{EF} C_F}} = \frac{(f_{CLK-E}*C_{R4}+f_{CLK-G}*C_{R2})}{C_2} \qquad (16)$$

SET:

$$P_3 = \frac{1}{C_3 R_5} = Z_{BB} = \frac{(f_{CLK-I}*C_{RS})}{C_3} \qquad \text{For Boost or Buck-Boost} \qquad (17)$$

SET:

$$P_3 = \frac{1}{C_3 (R_5/100)} = Z_{BB} = \frac{100 (f_{CLK-I}*C_{RS})}{C_3} \qquad \text{For Buck} \qquad (18)$$

FIG. 9(C)

DYNAMIC LOOP COMPENSATOR FOR CONTINUOUS MODE POWER CONVERTERS

BACKGROUND OF THE INVENTION

1. Field of the Invention

This invention relates generally to a continuous mode dynamic loop compensator, and, more particularly to a compensator that can identify the type of power converter circuit to which it is connected and thereafter maintain system stability by dynamically compensating for system changes that are dependent upon the duty cycle and hence input voltage and output load variations of the converter. Dynamic loop compensation is especially useful in the implementation of Boost and Buck-Boost power converters since it will maintain stability over a wide range of input voltages and output load current variations.

2. Description of the Prior Art

Power converters or dc-dc converters also known as choppers and switching regulators are widely used in electric automobiles, forklifts and dc voltage regulators amongst many other common uses. Basically these converters regulate the output dc voltage by varying the conduction time of a power switching device.

Among these converters there are two basic categories. In the first category, the forward converters, the output current is supplied to the load and to the output filter capacitor while the switching element is closed (on). Then, during the time that the switching element is open (off), the output inductor supplies current to the load and to the output filter capacitor through a recovery diode.

In the second category, stored energy converters, the output inductor stores energy in the form of current while the switching element is closed (on), and the output current is supplied to the load from the output filter capacitor. During the time the switching element is open (off), the output inductor supplies current to the load and to the output filter capacitor through a recovery diode.

Among these two categories there are three main converters circuit designs. These converter circuits determine the magnitude and polarity of the output voltage for a given input voltage. The first converter, the Buck Regulator, is a forward converter in which the average output voltage is less than the input voltage. Second is the Boost Regulator which is a stored energy converter wherein the average output voltage is greater than the input voltage. Finally, the third converter, the Buck-Boost Regulator, is also a stored energy converter in which the output voltage may be either less than or greater in magnitude than the input voltage.

Typically, regulation of the output voltage is achieved using either pulse width or frequency modulation techniques. These modulation techniques are further subdivided into voltage and current modes or a combination of the two depending on the output waveform requirements. In feed-forward voltage mode regulation the input voltage is sensed to modulate the pulse-width or the frequency to maintain proper regulation. Similarly, in feed-forward current mode regulation the input current is sensed as the mechanism used to modulate the pulse-width or the frequency. On the other hand, feedback voltage mode regulation senses the output voltage in determining the pulse-width or the frequency for regulation. Likewise, under feedback current control regulation the output current is sensed to achieve regulation.

Problems associated with these regulators occur when they are configured in the closed loop feedback design. In this case, sufficient loop phase-gain compensation must be applied to the system plant to maintain an adequate phase margin between the input and output voltages thereby preventing oscillations from occurring within the power converter. In the Boost and Buck-Boost converters the problem is further complicated in that changes in the duty cycle dynamically change the location of the poles and zeros of the system plant. In turn, these new pole and zero locations require compensation at different break points. Correspondingly, a fixed compensation network is not the best method of maintaining closed loop stability. However, prior art compensation designs such as lag and lead compensators employ fixed compensation break points and restrict themselves to the sensitivities of a non-dynamic system. As a result, there is a present need for a dynamic loop compensator that maintains system stability over a wide range of input voltages and output load currents. Furthermore, there is a need for a dynamic loop compensator that can identify the converter circuit design to which it is connected and compensate accordingly.

SUMMARY OF THE INVENTION

The dynamic loop compensator of the present invention solves the problem encountered by the prior art by the provision of a novel closed loop continuous mode dynamic loop compensator network that can maintain stability in either Buck, Boost or Buck-Boost converter circuits over a wide range of input voltages and output load currents. Furthermore, the compensation network contains a system identifier that enables the compensator to identify the circuit configuration in which it is employed.

The compensator of the present invention is dynamic in that it can adapt to changes in the input voltage, output load current and duty cycle which dynamically change the location of the poles and zeros of the system plant. These new pole and zero locations require compensation at different break points which the dynamic compensator of the present invention can provide.

The dynamic ability of the compensator is implemented with three elements. The first element is a bank of switching capacitors that act as variable resistors whose effective resistance depends upon the frequency of variable clock pulses which are fed into them. In turn these variable resistors change the transfer function of the compensation network such that the poles and zeros of the compensator counteract those of the system plant regardless of the duty cycle. As a result, the system is stable over a wider range of input voltages and output load currents than would be possible in a fixed compensation system.

The second element of the compensator network is a system identifier that identifies the converter circuit the compensator is being employed in and outputs a plurality of circuit topology identification signals that instructs the digital controller whether the dynamic compensator is connected to a Buck, Boost, or Buck-Boost converter. Finally, the third element of the compensator is the digital compensation controller which contains three separate digitally encoded compensation control algorithms, one each for the Buck, Boost, or Buck-Boost regulators.

Depending upon the converter circuit one of the three algorithms is selected to determine the clock frequency input to each capacitor bank and hence its effective resistance. In turn, the effective resistance determines the transfer function of the feedback network and hence the location in frequency of compensator's poles and zeros. As a result, the compensator's pole and zero locations can be made to dynamically counteract those of the system plant.

It is therefore a principle object of this invention to provide a dynamic loop compensator that can maintain stability in either a buck, boost or buck-boost converter circuit regardless of the duty cycle.

A further object of this invention is to provide a system identifier that can identify the converter topology the dynamic loop compensator is being employed in.

It is a further object of this invention to provide a digital compensation controller that generates a plurality of variable frequency clock signals.

It is a further object of this invention to provide a switching capacitor error amplifier network which is controlled by the digital compensation controller and produces a error compensation signal that provides dynamic compensation in either a buck, boost or buck-boost converter circuit.

In accordance with these and other objects which will become apparent hereinafter, the instant invention will now be described with particular reference to the accompanying drawings.

BRIEF DESCRIPTION OF THE DRAWINGS

FIG. 6 is a schematic of the system AC computer model;

FIG. 7 is a representative timing diagram showing clock signals A–J;

FIGS. 9 a–c contain the transfer function equations from which the poles and zeros of the system plant and compensation network are derived.

DESCRIPTION OF THE PREFERRED EMBODIMENTS

Figure 1:
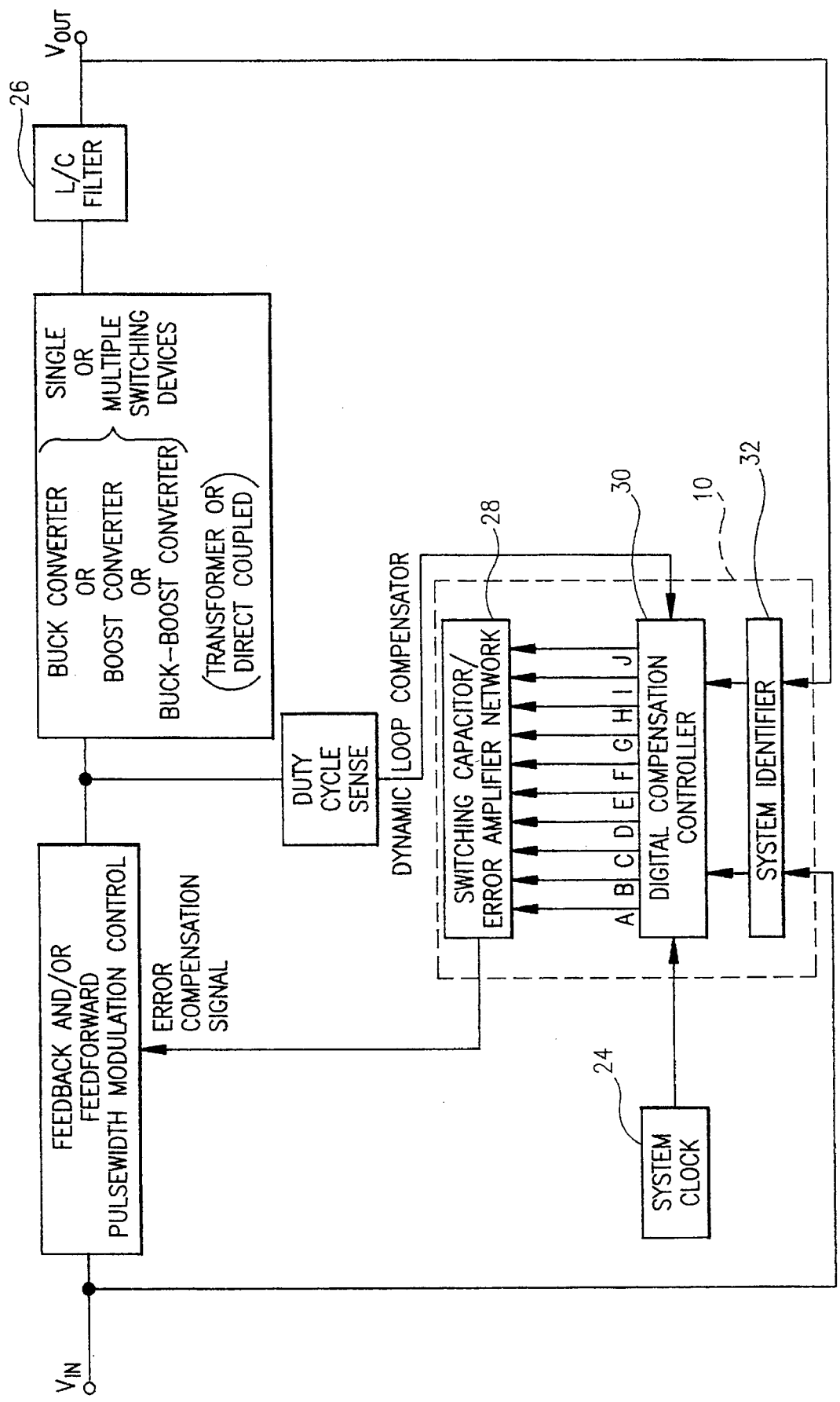
FIG. 1 is a block diagram of the system plant and dynamic loop compensator.
Figure 8:
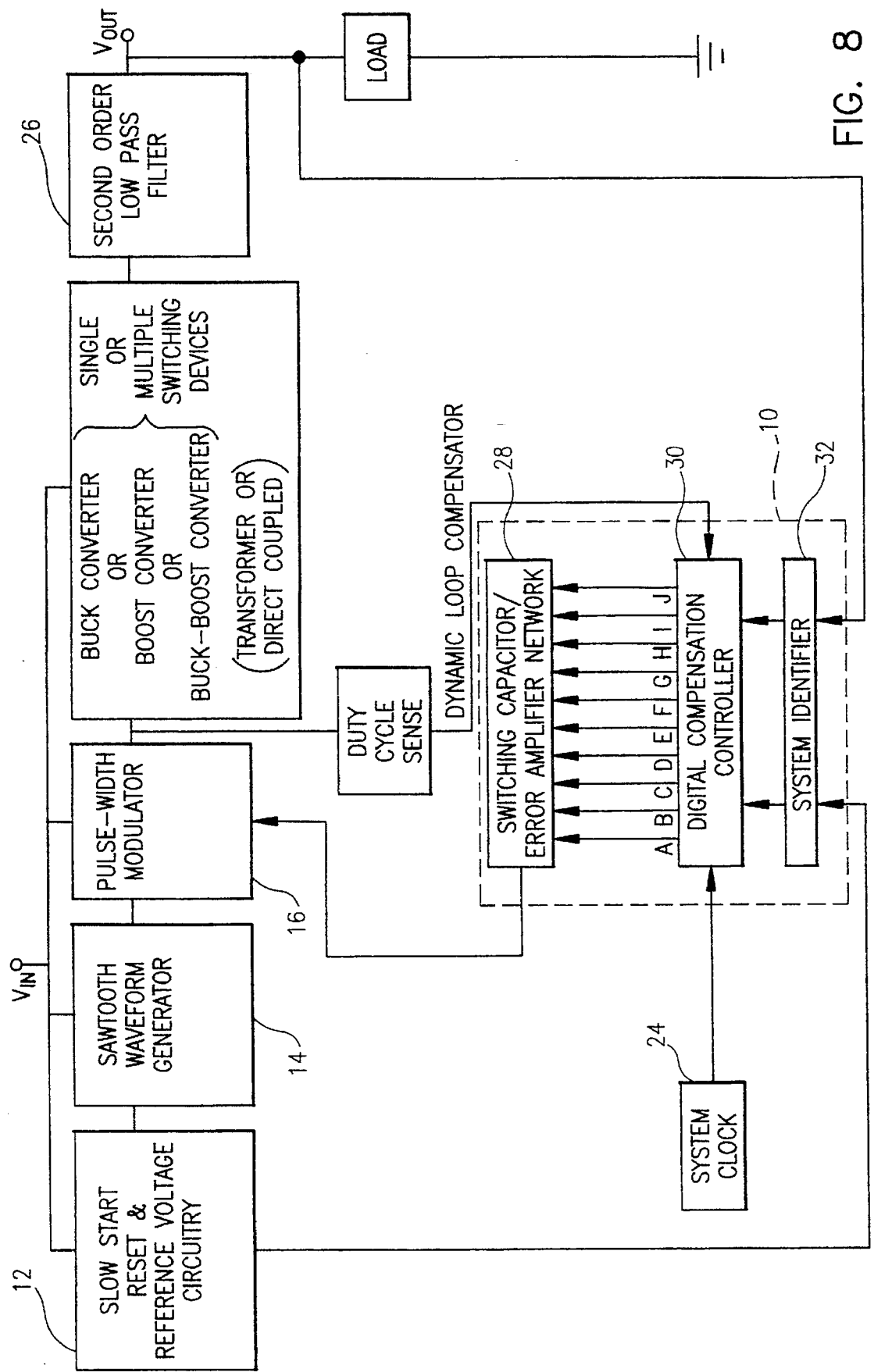
FIG. 8 is a block diagram of a preferred embodiment.

With reference to FIG. 1, there is depicted a dynamic loop compensator for use with continuous mode power converters that is generally characterized by reference numeral 10. FIG. 8, a more detailed block diagram, indicates the system plant and compensator shown in FIG. 1. As shown, the system is generally comprised of a slow start, reset, and reference voltage circuit 12, sawtooth waveform generator 14, pulse width modulator 16, Buck, Boost or Buck-Boost driver circuits 18, 20 and 22, system clock 24, and a second order low pass filter 26. Similarly, the compensator is generally comprised of switching capacitor network 28, digital compensation controller 30 and system identifier 32.

LOOP COMPENSATION

In the Buck Converter (shown in FIG. 2) loop compensation can be achieved with relative ease since the system's poles and zero are not dependant on duty cycle and hence not dynamic as can be seen in FIGS. 9a–c. Consequently, once the location in frequency, of the two poles created by the output second order low pass filter and the zero created by the output filter capacitor and its series resistance has been found, a phase-gain loop compensation network can be implemented for loop stability. The equations shown in FIGS. 9a–c identify the general requirements. The two zeros $Z_{C1}$ and $Z_{C2}$ of the compensator network are set at the same frequency as the two poles ($P_{F1}$ and $P_{F2}$) generated by the low pass output filter 26. Similarly, the first pole of the compensator network, $P_{C1}$, is placed at the location, in frequency, of the zero ($Z_{F1}$) created by the output filter capacitor and its series resistance.

The compensator controls the location of its poles and zeros by varying the frequency of clock signals A–J shown in FIG. 7 and discussed in detail below. This will yield an adequate phase margin for all load conditions, provided that a minimum load current demand is present at all times. A minimum load current is required in continuous mode operation and insures loop stability.

On the other hand, dynamic loop compensation is required in both the Boost and Buck-Boost power converters and is somewhat more complicated. The dynamic characteristics of these two converters arise from the duty cycle dependency of the two poles ($P_{F1}$ and $P_{F2}$) generated by the output low pass filter and a second zero ($Z_{BB}$) created by the load and output filter inductor as shown in FIG. 9a. Since the duty-cycle changes with input voltage and output load current the compensation network must be dynamic to insure loop stability. It should be noted that a third pole ($P_3$) must be added to the compensation network (R5 and C3 as shown in FIG. 6) to offset the second zero ($Z_{BB}$) generated by the output low pass filter in the Boost and Buck-Boost converters. This pole ($P_3$) is also present in the Buck converter compensation network, however, it presents no adverse affects, as long as it is placed well out in frequency so it does not significantly alter the phase margin.

Figure 2:
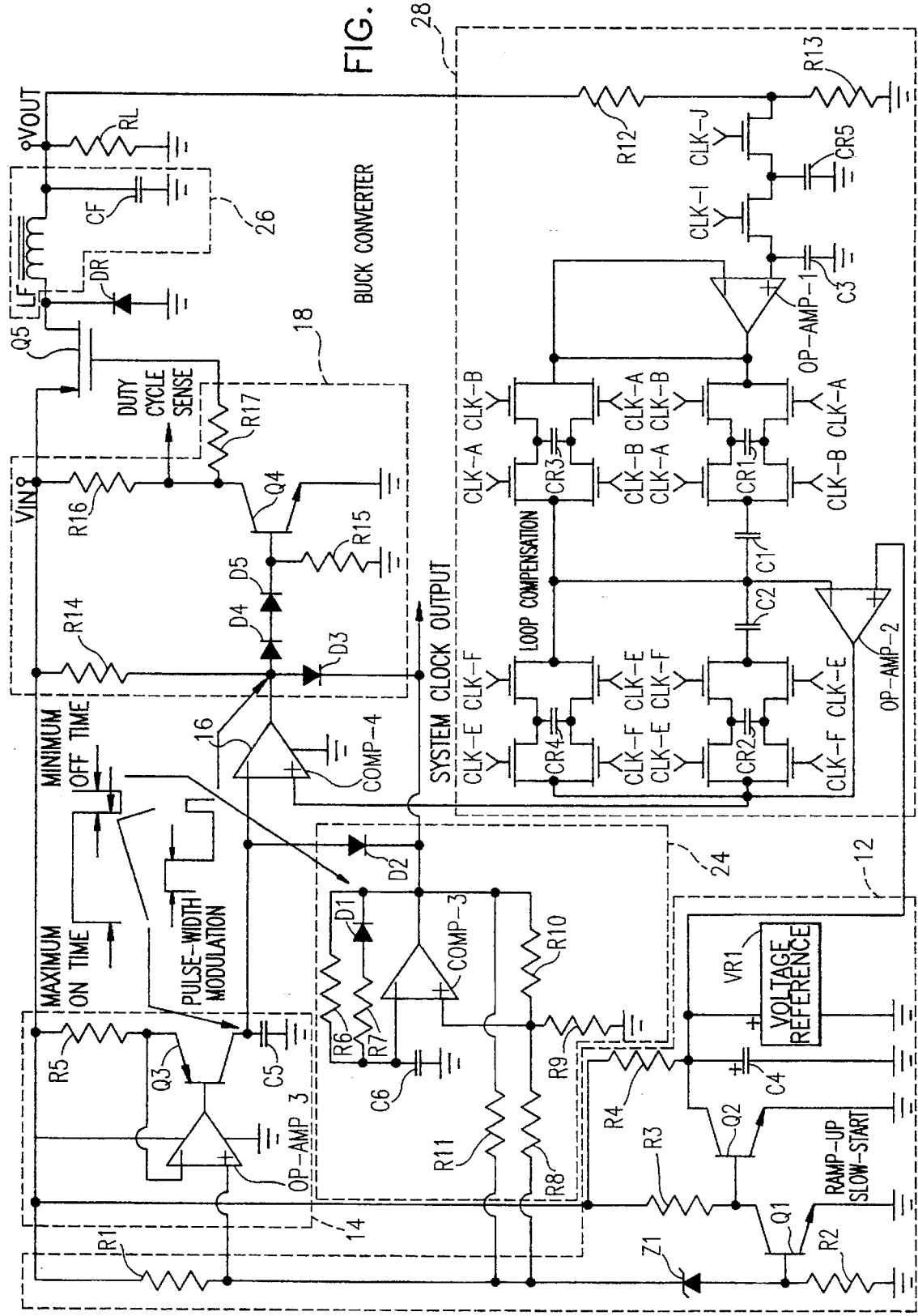
FIG. 2 is a schematic of the Buck Converter circuit and switching capacitor error amplifier feedback network.
Figure 3:
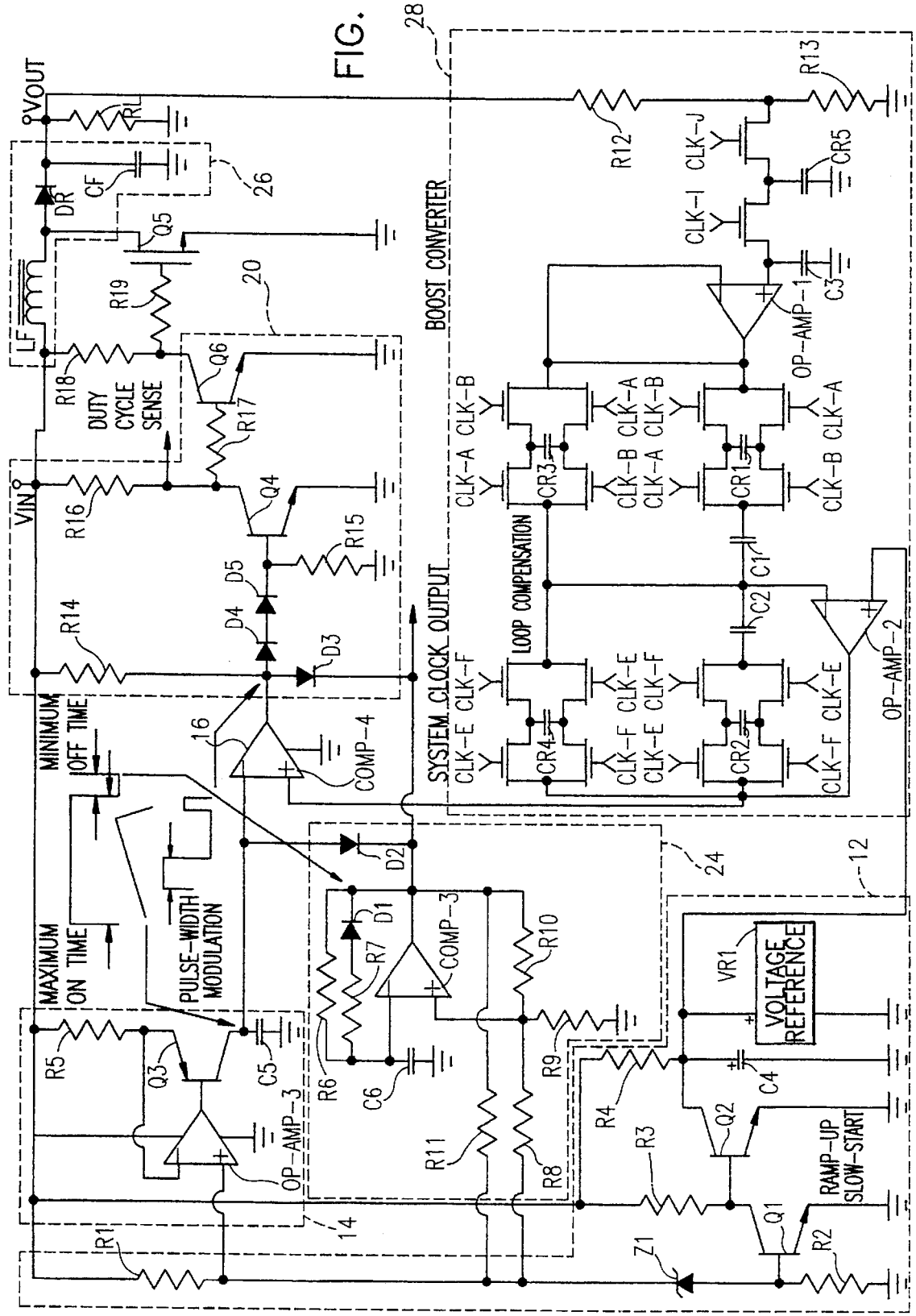
FIG. 3 is a schematic of the Boost Converter circuit and switching capacitor error amplifier feedback network.
Figure 4:
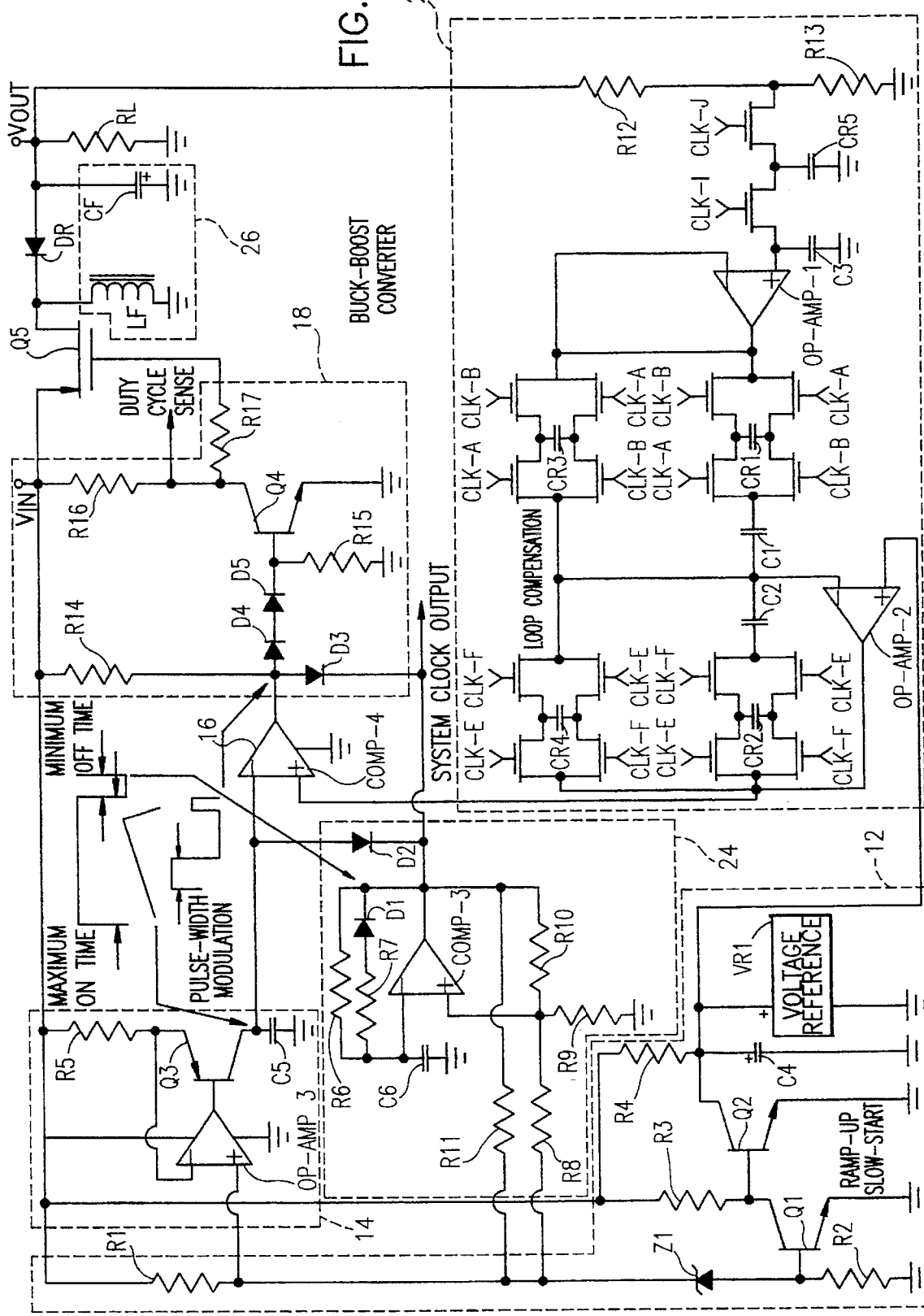
FIG. 4 is a schematic of the Buck-Boost Converter circuit and switching capacitor error amplifier feedback network.

The compensator of the present invention derives its dynamic characteristics from a bank of switching capacitors CR1 through CR5 as shown in FIGS. 2, 3 and 4. However, in FIG. 6, the AC computer model, the switching capacitors are shown as resistors R1 through R5. In the preferred embodiment the switching capacitors are amorphous thin-film transistors. The effective resistance values of resistors R1 through R5 is determined by variable frequency clock signals (CLK-A through CLK-J) and the bank of switching capacitors CR1-CR5 shown in FIGS. 2–4. In general, the effective resistance of resistors R1 through R5 is equal to one over the capacitance times the clock frequency input to the capacitor as shown in FIG. 7. In the preferred embodiment, the digital controller 30 shown in FIG. 5 implements one of three algorithms depending on the circuit configuration (Buck, Boost, or Buck-Boost) to determine the frequency of the clock signal input to each capacitor and hence its effective resistance. The particular algorithm implemented is dependent on the system identifier 32 of the dynamic loop compensator also shown in FIG. 5.

Figure 5:
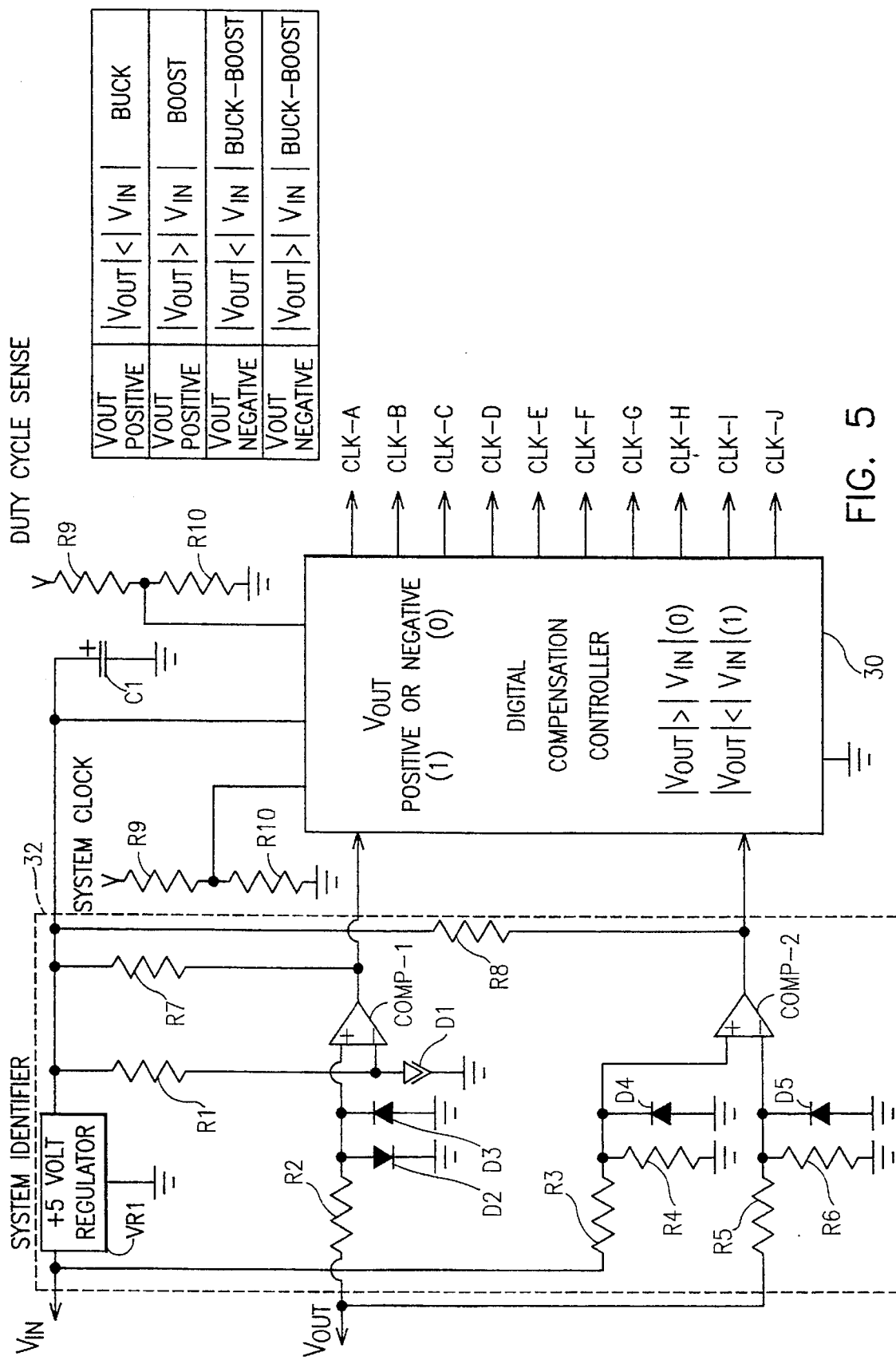
FIG. 5 is a schematic diagram of the System Identifier and Digital Compensation Controller of the dynamic loop compensator.

The digital compensation controller 30 requires four input system condition signals to implement the proper compensation algorithm and produce the proper frequency clock signals necessary for compensation. The four signals are: a system clock signal, a duty cycle sense signal, and the two circuit topology identification signals which are produced by the system identifier 32. System identifier 32, as shown in FIG. 5, identifies the converter circuit the dynamic loop compensator is operating within and generates the two circuit topology identification signals required by the digital compensation controller. Specifically, the system identifier generates two circuit topology identification signals, the first signal indicates the output voltage polarity and the second signal which indicates which is greater in magnitude the input or output voltage. In turn, the digital controller interprets these two identification signals and implements either the Buck, Boost, or Buck-Boost compensation algorithms accordingly. With reference to FIG. 5, the system identifier identifies the converter circuit and generates the proper circuit topology identification signals in the following manner. If the input voltage is positive and is less in magnitude than the output voltage, the system identifier concludes the buck circuit configuration is being implemented and comp-1 and comp-2 both output a high (1) signal. Accordingly the digital compensation controller interprets the output from comp-1 and comp-2 and the Buck compensation algorithm is selected. On the other hand, if the output voltage is positive and is greater in magnitude than the input voltage, the system identifier concludes the Boost circuit configuration is being implemented and comp-1 outputs a high (1) signal and comp-2 outputs a low (0) signal. Accordingly, the digital compensator controller interprets the output from comp-1 and comp-2 and the Boost compensation algorithm is selected. Finally, if the output voltage is negative and is less than or greater in magnitude than the input voltage the system identifier concludes the Buck-Boost circuit configuration is being implemented. In this case, comp-1 outputs a low (0) signal while the output of comp-2 may either be low (0) or high (1). As before the digital compensation controller interprets the outputs of comp-1 and comp-2 and implements the Buck-Boost algorithm. It is important to note that the system identifier assumes a positive input voltage and continuous mode operation when determining which circuit configuration it is operating within.

FIG. 7 generally represents a sampling of clock signal wave forms for the switching capacitor compensation network. Additionally, FIG. 7 indicates the general relationship between the clock frequency and the effective resistance of the capacitors CR1 through CR5. Preferably, non-overlapping out of phase clock signals are used. The non-overlapping out of phase feature can clearly be seen when comparing the wave forms of clock A to that of clock B. As illustrated, the edges are not aligned and the signals are out of phase.

Circuit Operation

The converter circuits and compensators shown in FIGS. 2, 3 and 4 can be divided into eight distinct parts. They are: 1) Slow start, reset, reference voltage circuitry 12; 2) System clock 24; 3) Sawtooth waveform generator 14; 4) Pulse width modulator 16; 5) Voltage mode switching capacitor error amplifier network 28; 6) Power switching circuits 18 and 20; 7) Low pass filter 26; and of course 8) The load.

The slow start, reset and reference voltage circuitry 12 is formed by Resistors R1, through R4, Capacitor C4, Transistors Q1, Q2, Zener diode Z1, and Voltage Reference VR1. When the input voltage is initially applied, Q2 holds the voltage across C4 and the voltage value of VR1 at near zero volts through the base drive current of resistor R3. However, as soon as the input voltage reaches a value that is slightly greater than the zener voltage plus the base emitter voltage drop of Q1, transistor Q1 will turn on, thereby turning off Q2, which allows the voltage across C4, and voltage reference VR1 to slowly ramp-up to its final value. Since the voltage verses time waveform of Voltage Reference VR1 controls the pulse-width, as will be discussed shortly, the output voltage will rise in the same fashion.

The system clock 24 is an oscillator formed from Resistors R6 through R11, Capacitor C1, Comp-3, and Diode D1. Resistor R6 charges Capacitor C6 which determines the maximum on time of the power switching transistor Q6. Resistor R7 and Diode D1 discharge Capacitor C6 which determines the minimum off time of the power switching element S. Diode D2 is used to turn off transistor Q4 and the power switching transistor Q6 during the minimum off time.

The sawtooth waveform generator 14 required for pulse-width modulation, and feed forward regulation is formed from Resistor R5, Transistor Q3, Operational Amplifier 3, and Capacitor C5. A constant current is developed in Q3 from the zener voltage across Z1, Operational Amplifier 3, and R5. This constant current linearly charges Capacitor C5, which is discharged periodically by a negative pulse generated by the system clock 24, thereby, developing a sawtooth waveform at the negative input of Comp-4. The peak value of the sawtooth waveform is varied by the input voltage (Vin) to the regulator, since the voltage across R5 changes linearly with the input voltage, thereby changing the magnitude of the constant current in Capacitor C5. This action gives rise to the feed-forward regulation of the output voltage, since variations in the peak voltage of the sawtooth waveform will vary the pulse width.

Resistors R14 through R17, Diodes D4 and D5, Transistor Q4, and in the case of the Boost converter only, Transistor Q6, forms a simple driver circuit that turns the power switching transistor Q5 on and off.

The voltage mode switching capacitor error amplifier feedback network 28 produces a slowly varying DC voltage and is formed by resistors R12 and R13, Capacitors C1 through C3, Operational Amplifiers 1 and 2, and the five switched capacitor networks CR1-CR5. This slowly varying DC voltage is compared to the sawtooth waveform at the negative input of Comp-4. Since the time period is fixed by the system clock 24, pulse-width modulation is achieved at the output of Comp-4 by comparing the instantaneous voltage levels of these two signals on a periodic basis. The on time of the power switching transistor Q5 is greater when the output signal at Comp-4 is high for a larger percentage of the available cycle time. This will occur when either the input voltage decreases (feed-forward voltage mode control), or the output voltage decreases due to changes in load current (feedback voltage mode control). Conversely, the on time of the power switching transistor Q5 will decrease whenever the input voltage increases, or whenever the output voltage increases.

The power switching element is indicated by Q5 in FIGS. 2–5 and generally illustrates a single power switching transistor. It is realized however that this invention can be implemented with several power switching devices and further that all of these regulators may be either direct or transformer coupled.

The second order low pass filter 26 is formed from Inductor LF, and Capacitor CF. This filter reduces the high frequency components in the output waveform to a small amount of high frequency ripple, allowing a smooth DC component to pass through to the load. Since the corner frequency of the filter is set approximately one decade above the 120 hertz input line frequency (assuming a full bridge rectifier and filter capacitor input), the loop response will be such that this low frequency ripple will be removed from the output voltage through pulse-width modulated regulation.

It is important to note that this invention is concerned with continuous mode operation mode only, with a positive input voltage. This means that the current in the output filter inductor will never go to zero.

FIG. 2 illustrates the present invention, excepting the system identifier 32 and the digital logic controller 30, implemented in a Buck converter. When Q5 is turned on, current is passed through the output filter inductor LF, which supplies the DC current to the load RL and a high frequency ripple current to capacitor CF, while the recovery diode DR is reversed biased and therefore not passing any current. When Q5 is turned S off, the polarity of the voltage across the inductor is reversed, causing the inductor to become a current source which maintains the DC current in the load RL and the high frequency ripple current in capacitor CF given the recovery diode DR is now forward biased. This is consistent with the operation of a forward converter discussed supra.

With reference to FIGS. 9a and 9b, the Buck circuit contains two poles ($P_{F1}$ and $P_{F2}$) and one zero ($Z_{F1}$) all of which are constant. Correspondingly, the compensator network contains two zeros ($Z_{C1}$ and $Z_{C2}$) and one pole ($P_{F1}$) that are all variably dependent on the input clock frequencies. However, in the Buck Regulator these zeros remain constant since the corresponding poles ($P_{F1}$ and $P_{F2}$) are not dependent on the duty cycle D. Additionally, the compensator contains two additional poles ($P_2$ and P3) that are not used for compensation in the Buck circuit. However, these poles are placed so as to not significantly alter the phase margin.

FIG. 3 illustrates the present invention, excepting the system identifier 32 and the digital logic controller 30, implemented in a Boost Converter. When Q5 is turned on, current flow charges up the output filter inductor LF, while the recovery diode DR is reversed biased and therefore passes zero current. During this time the DC current in the load RL is being supplied by the output filter capacitor CF. When Q5 is turned off, the polarity of the voltage across the inductor is reversed thereby forward biasing the recovery diode DR and causing inductor LF to become a current source which maintains the DC current in the load R and recharges capacitor CF which is consistent with the operation of a stored energy converter discussed supra. In the boost converter the output voltage is greater than the input voltage because the reverse EMF value of the inductor adds to the input voltage. It should be noted that an inverter, transistor Q6, was added to the driver circuit 20, because the power switching transistor Q5 was placed in parallel with the load, rather than in series with the load.

With reference to FIGS. 9a and 9b, the Boost circuit contains two poles ($P_{F1}$ and $P_{F2}$) and one zero ($Z_{BB}$) that are dependant on the duty cycle D. Accordingly, the location in frequency of these poles and zero change with the input voltage and output load current variations and therefore require dynamic compensation. To counteract the system's dynamic characteristics, the digital compensator controller 30 dynamically controls the frequency of variable clocks (CLK-A through CLK-J) to change the compensators zeros and poles according to the equations shown in FIGS. 9b and 9c such that they cancel out the system's poles and zeros regardless of the duty cycle. Simply put, the controller changes the frequency of the variable clocks and thereby changes the effective resistance of the capacitors CR1–CR6 which in turn change the compensation points such that the error amplifier output maintains system stability over a wide range of input voltages and output load current variations.

FIG. 4 illustrates the present invention, excepting the system identifier and the digital logic controller 30, implemented in a Buck-Boost converter. When Q5 is turned on, current flows in the output filter inductor LF and is stored as energy while the recovery diode DR is reversed biased and therefore conducting zero current. During this time the DC current in the load RL is being supplied by the output filter capacitor CF. When Q5 is turned off, the polarity of the voltage across inductor LF is reversed, causing the inductor to become a current source which maintains the DC current in the load RL and recharges the output capacitor CF during the off time of Q5 since the recovery diode DR is forward biased and conducting current. The output voltage will be negative because of the reverse EMF value of the inductor and the connection of the recovery diode DR. In magnitude the output voltage may be greater than or less than the magnitude of the input voltage. This is controlled by the voltage mode feed-forward and feedback systems that determine the duty cycle D.

Again referencing FIGS. 9a and 9b, the Buck-Boost circuit contains two poles ($P_{F1}$ and $P_{F2}$) and one zero ($Z_{BB}$) that are dependant on the duty cycle D. Similar to the Boost regulator, the location in frequency of these poles and zero change with the input voltage and output load current variations and therefore require dynamic compensation. As in the Boost regulator, the digital compensation controller 30 dynamically controls the frequency of variable clock signals (CLK-A through CLK-J) to change the compensators zeros and poles such that they counteract the system's poles and zeros. As a result, the compensator can dynamically change the compensation points and provide system stability over a wide range of input voltages and output load current variations.

In FIG. 9c there is shown pole $P_2$ located in the compensator. This pole is designed to set the DC gain of the network and does not have any role in the dynamic compensation aspect of the invention.

The instant invention has been shown and described herein in what it is considered to be the most practical and preferred embodiment. It is recognized, however, that departures may be made therefrom within the scope of the invention and that obvious modifications will occur to a person skilled in the art. The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A dynamic loop compensator for use in continuous mode buck, boost, and buck-boost converter circuits, each of said converter circuit including means for producing a plurality of circuit condition signals including an input voltage, an output voltage, a system clock, and a duty cycle signal, said dynamic loop compensator comprising:

means for dynamic control, said means for control connected to one of said converter circuits, said means for control receiving at least certain of said plurality of circuit condition signals of said one converter circuit, said means for control including means for producing a plurality of variable frequency clock signals based upon the relative amplitudes and polarities of said input and output voltages, the system clock, and the duty cycle signal of said one converter circuit;

plurality of means for producing a variable resistance, each of said plurality of means for producing a variable resistance connected to said means for dynamic control and receiving at least one of said plurality of variable frequency clock signals, each of said plurality of variable frequency clock signals determining an effective resistance of at least one of said variable resistances;

means for amplifying, said means for amplifying connected to said plurality of means for producing variable resistances, said means for amplifying further connected to said one converter circuit, said means for amplifying producing a compensation signal based upon each effective resistance to compensate for variations in input voltage and output load current of said one converter circuit;

whereby said compensation signal maintains stability in the one converter circuit, irrespective of the type of converter circuit.

2. The dynamic loop compensator as set forth in claim 1 wherein said means for dynamic control further includes a digitally encoded buck converter compensation algorithm.

3. The dynamic loop compensator as set forth in claim 1 wherein said means for dynamic control further includes a digitally encoded boost converter compensation algorithm.

4. The dynamic loop compensator as set forth in claim 1 wherein said means for dynamic control further includes a digitally encoded buck-boost converter compensation algorithm.

5. The dynamic loop compensator as set forth in claim 1 further including means for identifying a converter circuit topology, said means for identifying connected to said one converter circuit and said means for dynamic control, said means for identifying receiving at least certain of said plurality of circuit condition signals of said one converter circuit, said means for identifying producing a plurality of circuit topology identification signals based upon the relative polarities and magnitudes of the input and output voltages of the one converter, said means for dynamic control receiving said plurality of circuit topology identification signals.

6. The dynamic loop compensator as set forth in claim 1 wherein said means for dynamic control is a digital compensation controller.

7. The dynamic loop compensator as set forth in claim 6 wherein said digital compensation controller includes three digitally encoded converter circuit compensation algorithms, one each for a buck, boost and buck-boost converter.

8. The dynamic loop compensator as set forth in claim 1 wherein said plurality of means for producing a variable resistance are a plurality of amorphous silicon thin-film transistors.

9. The dynamic loop compensator as set forth in claim 1 wherein said plurality of circuit condition signals are an input voltage signal and an output voltage signal.

10. A dynamic loop compensator for use in continuous mode buck, boost, and buck-boost types of converter circuits, each of said converter circuits including means for producing a plurality of circuit condition signals including an input voltage, an output voltage, a system clock, and a duty cycle signal, said dynamic loop compensator comprising:

means for identifying a converter circuit topology, said means for identifying connected to one of said converter circuits and receiving at least certain of said plurality of circuit condition signals of said one converter circuit, said means for identifying producing a plurality of circuit topology identification signals based upon the relative amplitudes and polarities of input and output voltages of said one converter circuit;

means for dynamic control, said means for control connected to said means for identifying and said one converter circuit, said means for control receiving said plurality of circuit topology identification signals, said means for control further receiving at least certain of said plurality of circuit condition signals of said one converter circuit, said means for control including means for producing a plurality of pairs of variable frequency out-of-phase, non-overlapping clock signals based upon said plurality of circuit topology identification signals the system clock, and the duty cycle signal of said one converter circuit;

plurality of means for producing a variable resistance, each of said plurality of means for producing a variable resistance connected to said means for dynamic control and receiving at least one of said plurality of variable frequency clock signals, each of said plurality of variable frequency clock signals determining an effective resistance of at least one of said variable resistances;

means for amplifying, said means for amplifying connected to said plurality of means for producing a variable resistance, said means for amplifying further connected to said one converter circuit, said means for amplifying producing a compensation signal for small signal variations in input voltage and output load current of said one converter circuit based upon at least certain of said circuit condition signals of said one converter circuit and said effective resistances;

whereby said compensation signal maintains stability in the one converter circuit, irrespective of the convert circuit type.

11. Apparatus providing dynamic loop compensation for input voltage and output load current variations in continuous mode power converters of the buck, boost, and buck-boost type, said apparatus comprising:

one of said converters having input and output voltages, a system clock signal, and a duty cycle signal;

circuit means responsive to the relative polarities and magnitudes of the input and output voltages for determining the type of said one converter and for producing output identification signals representative of said one converter type;

a compensation controller responsive to said identification signals, to the system clock signal, and to said duty cycle signal for producing a plurality of pairs of variable frequency, out-of-phase, non-overlapping clock signals in accordance with a respective compensation algorithm corresponding to said one converter type;

an error amplifier network including a plurality of pairs of switching capacitors coupled to respective ones of said pairs of clock signals for producing an effective variable resistance as a function of said variable clock frequency;

said error amplifier network coupled in a closed feedback loop of the one converter for dynamically compensating for variations in the input voltage and the output load current of the one converter, thereby maintaining stability in the one converter circuit.

* * * * *